March 19, 1940.  L. D. SOUBIER  2,194,451
PACKAGE FOR COFFEE OR THE LIKE
Filed March 20, 1936
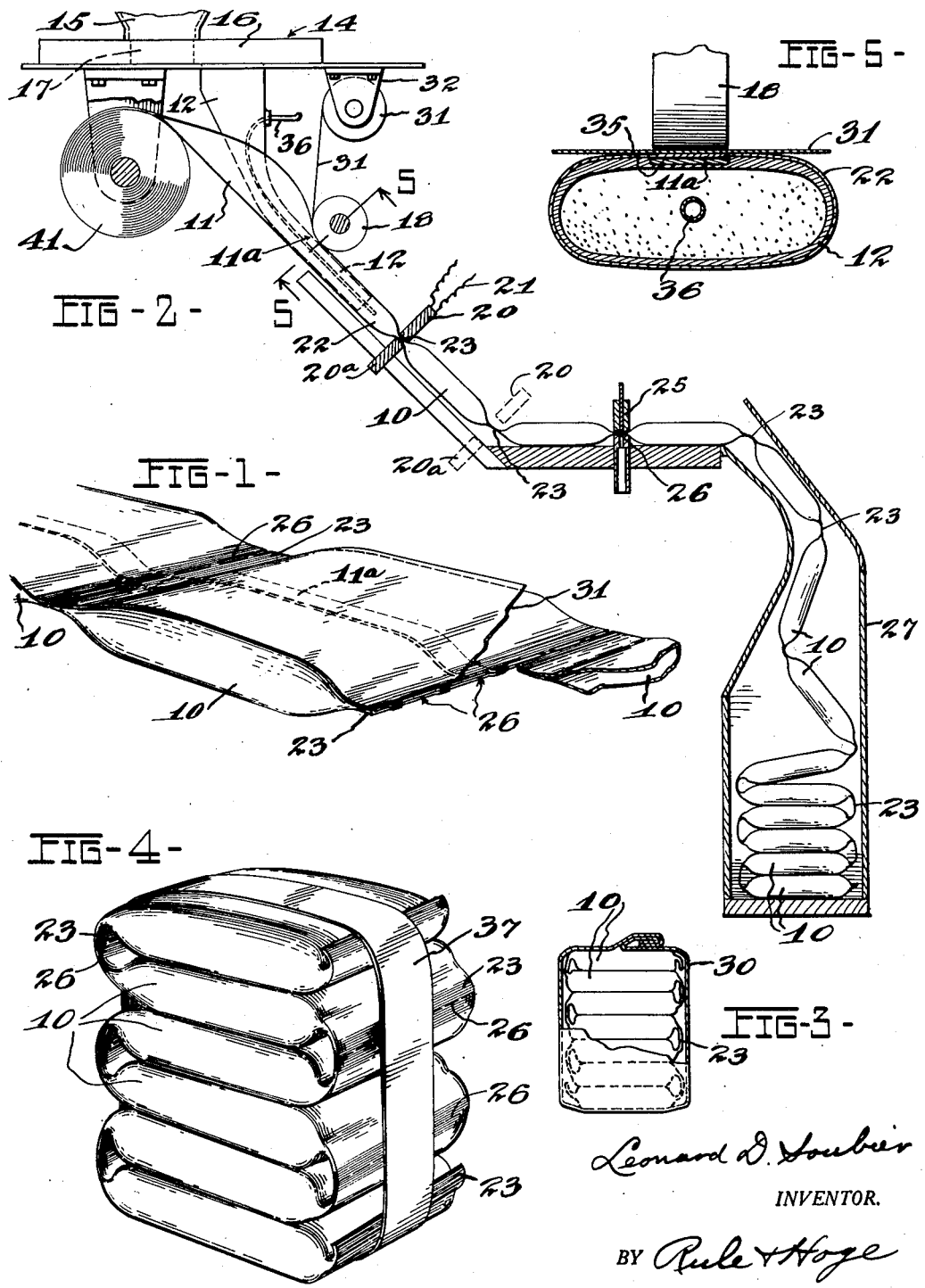
Leonard D. Soubier
INVENTOR.
BY Rule & Hoge
ATTORNEYS.

Patented Mar. 19, 1940

2,194,451

UNITED STATES PATENT OFFICE 2,194,451

PACKAGE FOR COFFEE OR THE LIKE

Leonard D. Soubier, Toledo, Ohio, assignor to Owens-Illinois Glass Company, a corporation of Ohio Application March 20, 1936, Serial No. 69,793

4 Claims. (Cl. 206—56)

The present invention relates to a container for various materials, particularly foodstuffs which are affected by exposure to the atmosphere. In the packaging of foodstuffs such as ground coffee, particularly, it is important that they do not become exposed to the atmosphere. Even if the coffee is packed in an air-tight container such as a sealed jar or the like, after the cover has been removed the coffee may begin to deteriorate due to exposure to the atmosphere. Although the cover may be tightly replaced, the fresh and tasty quality of the coffee may be gradually lost due to this original exposure. Repeated exposures, of course, aggravate the condition.

It is an object of the present invention to provide a container which is air-tight, moisture-proof and which will prevent deterioration of the materials packed therein even though portions may be withdrawn for use.

In addition, coffee which is packed in a can, jar or large bag, when used by the average housewife, is measured out in more or less indefinite quantities. It is customary to withdraw a spoonful for each cup of coffee to be prepared but it is difficult as a practical matter to withdraw accurate quantities from these relatively large containers. By withdrawing the coffee in inaccurate amounts, sometimes too much and sometimes too little, a poorer quality of coffee may be made and considerable quantities may be wasted.

It is an object, therefore, of the present invention to provide a container for coffee or the like which will make available for use definite predetermined and accurately measured quantities of coffee. Quantities of the coffee may be used in accordance with the number of cups of coffee to be made and these quantities may be used without exposing the remainder of the coffee left in the container.

It is another object of the present invention to provide a food package which will not crack or form leaks due to aging or handling. It is intended to utilize a plastic substance which will bend and stretch and which will not form minute fissures or air leaks or break down under the presence of water or other liquid. Thus, it is an aim to retain all the fragrance and aroma of the coffee or other food within the package.

Another object is to provide a food package which is transparent. In the merchandising of various foods it is advantageous to provide a transparent package through which the purchaser may see the contents. In the packaging of coffee, the size of the grounds is an important feature, particularly since different degrees of grinding are required for different types of preparations, as, for example, percolating, drip, or boiled coffee.

A food package, besides having the above characteristics, must also be free from an inherent flavor in itself. The portions thereof which come into contact with the foodstuff should not impart a foreign taste or aroma to the same. It is an aim, therefore, in the manufacture of the package, to utilize a substance which will not taint the coffee or other food substance with a foreign taste or aroma.

It is also an object of the present invention to provide a package for ingredients in which measured quantities of said ingredients are hermetically sealed in separate compartments of a container in such a manner that one compartment may be detached from the others without breaking their hermetic seals.

A further object in conjunction with the above is the provision of these sealed compartments in a single length of a transparent material.

It is a further object of the present invention to provide a continuous method of packaging foodstuffs such as coffee or the like.

Other objects and advantages of the present invention will become apparent from the following description taken in conjunction with the drawing, in which:

Fig. 1 is a perspective view, partly fragmentary, of my improved container;

Fig. 2 is a diagrammatic sectional view of an apparatus for packaging foodstuffs and fabricating a container according to the present invention;

Fig. 3 is a sectional view of a complete package;

Fig. 4 is a perspective view of a slight modification thereof; and

Fig. 5 is a cross-sectional view taken along the line 5—5 of Fig. 2.

The present invention contemplates a series of individual packages 10 formed from a continuous tape or sheet 11 of moisture and air-proof material such as a thermoplastic rubber compound or the like. The particular rubber compound intended for use here is known by the trade name of "Pliofilm" and is a moisture-proof and air-proof compound and may be sealed and fastened together by the application of heat. When heat is applied to a lap joint of the "Pliofilm," the "Pliofilm" fuses together and forms an air-tight or hermetic seal. A plastic substance such as "Pliofilm" will bend and stretch and will not crack or form leaks due to aging or handling. All of the fragrance and aroma of the coffee can be retained in such substance.

Referring to Fig. 2, the "Pliofilm" is fed from a roll 41 and is folded over a combined chute and mandrel 12 to provide a lap joint 11a along which a weld is adapted to be made by the application of heat thereto. The material to be packed drops down the chute 12 in measured quantities from a measuring apparatus 14. The measuring apparatus 14 comprises a hopper 15 and a reciprocating feeder 16. The feeder 16 is provided with an opening 17 of predetermined size which registers at one extreme position with the hopper 15 and registers with the chute 12 at the other extreme position. When the feeder 16 is at the former extreme position shown at the left on Fig. 2, the material drops down from the hopper and fills the opening 17. The feeder is then moved to the right, shutting off the hopper 15 and delivering the material in the opening 17 to the chute 12.

A roll of strip paper 31 mounted in a bracket 32 for free feeding is positioned above the chute 12 and in such a manner that the paper 31 may be fed between a heated roll 18 and the lap joint 11a of the tube 22 in order to prevent direct contact between the tube 22 and the heated roll 18. Direct contact of a heated member and "Pliofilm" results in a breaking down of the favorable characteristics of the material.

It will be noted that the strip paper 31 is of the same width as the tube 22 but is contacted by the heated roll 18 only through the width of the lap joint 11a throughout the length of the tube, thus causing an adhesion of the paper and "Pliofilm" along this narrow band while at the same time creating a bond or weld between the overlapping edges of the joint 11a.

At the portions of the tube 22 where the transverse seals 23 are made, there is likewise caused a bonding between the "Pliofilm" and the paper strip 31 only through the width of the transverse seal portions where the heated element 20 contacts said strip 31. Thus, it will be noted that the paper 31 and the tube 22 will be bonded together in a sort of I formation on each individual compartment or packet 10.

In order to prevent sticking of tube 22 to the mandrel 12 during the application of heated roll 18, a fibroid strip 35 is provided and embedded in the metal of the mandrel 12, thus insulating the tube from metal contact.

As shown in Fig. 2, a tubular member 36 is provided which projects into the center of mandrel 12 and this tube may be utilized to inject inert gases into each packet 10 or to exhaust gases by vacuum from each packet before it is sealed. The electrically heated element 20, to which current is supplied through conduits 21, and a fibroid anvil 20a cooperate in clamping, collapsing and sealing together the layers of the tube in transverse regions thereof and at regularly spaced points. The heat supplied to this transverse portion of the tube softens the thermoplastic material and forms a seal 23.

After the transverse seal 23 has been formed, the element 20 advances together with the tube to the position illustrated in dotted outline which is removed from the original position thereof a predetermined distance depending upon the length of the individual packets 10 which it is desired to form. At this second position the two faces of the element 20 are withdrawn and returned to their original position where they are reclamped over the tube 22 to be ready for the next charge of material from the feeder 14. After the tube has been sealed into individual packages 10, the seals 23 advance to a scoring device 25. The scoring device 25 impresses or cuts a score line or slots 26 along the seal 23 to form a weakened line for tearing. The packages may thus be easily severed along the weakened lines 26. Beyond the scoring device 25 is a stacking chute 27 into which the packages 10 are introduced to form a stack. When the desired number of the individual packages 10 have been stacked, they may be wrapped into a separate wrapping or the like such as is shown in Fig. 3 or Fig. 4.

In Fig. 3 a stack of individual packages have been shown to be inserted into a carton 30. This carton may be made of paper, metal, glass, cardboard, cloth or the like, to form a unit capable of being readily and practically merchandised.

In Fig. 4 the stack has been shown wrapped in the binding 37. Other bindings and wrappings, of course, are contemplated. It will be noted that the transverse strip or seal 23 has been made sufficiently wide so that the packages when laid on top of one another may be fitted smoothly and snugly in a carton or package without loss of space. The "Pliofilm" or other covering is sufficiently elastic so that the contents of the individual packages 10 may expand at the ends adjacent the seal 23 and fill up the corners of the package. Thus, the present container utilizes substantially all of the space in the carton.

When a housewife purchases a carton of these individual packages, the carton may be opened without fear of deteriorating the contents since they are protected in the individual hermetically sealed packages 10. One or more of the individual packages may be severed from the string, the number taken depending upon the amount of coffee, for example, which she desires to prepare.

It is desirable to place in each of the packages a sufficient amount of coffee to make a definite number of cups. For example, enough coffee for 1, 2, 4, 6 or 8 cups may be placed in each package 10. The housewife can readily sever from the string the proper amount of packages which are needed. In this way there is no wastage of coffee due to inaccuracy of measurement and the housewife may always be assured that she has taken the correct amount of coffee for her needs and that said coffee has its original aroma and flavor. It is possible, of course, to provide different sized packages for strong or weak preparations, as one skilled in the art would understand.

Variations and modifications may be resorted to which are within the scope and spirit of the appended claims.

I claim:

1. A container for coffee comprising an elongated strip of sheet rubber material of tubular form capable of being flattened and having adjacent longitudinal edges that overlap, said edges being coextensively secured together throughout the entire length of the overlapping portions, the inner opposed sides of the tube being secured to each other throughout a series of equally spaced regions that extend transversely of the tube to provide a series of interconnected hermetically sealed individual packets, all of which are of equal size and are adapted to contain equal quantities of coffee, and a paper backing strip coextensive with the tube when flattened and secured thereto along the said spaced regions.

2. A container for coffee comprising an elongated strip of sheet rubber material folded into tubular form and having adjacent longitudinal edges that overlap, said edges being coextensively secured together throughout the entire length of the overlapping portions, the inner opposed sides of the tube being secured to each other throughout a series of equally spaced regions that extend transversely of the tube to provide a series of interconnected hermetically sealed individual packets, all of which are of equal size and are adapted to contain equal quantities of coffee, and a paper backing strip coextensive with the folded tube and secured thereto along the said spaced regions, said backing strip being of a width equal to the width of the folded tube and being unattached thereto except in the said spaced regions.

3. A container for coffee comprising an elongated strip of sheet rubber material of tubular form and having adjacent longitudinal edges that overlap, said edges being homogeneously united throughout the entire length of the overlapping portions, the inner opposed sides of the tube being homogeneously united throughout a series of equally spaced regions that extend transversely of the tube to provide a series of individual packets, and a paper backing strip coextensive with the tube and physically united thereto along the homogeneous'y united portions of the tube, said backing strip being of a width equal to the width of the tube when flattened and being unattached thereto except in the regions of the homogeneously united portions of the tube.

4. A container for coffee comprising an elongated strip of sheet rubber material of tubular form and having adjacent longitudinal edges that overlap, said edges being homogeneously united throughout the entire length of the overlapping portions, the inner opposed sides of the tube being homogeneously united throughout a series of equally spaced regions that extend transversely of the tube to provide a series of individual packets, and a paper backing strip coextensive with the tube and physically united thereto along the homogeneously united portions of the tube, said backing strip being unattached to the tube except in the regions of the homogeneously united portions of the tube.

LEONARD D. SOUBIER.